United States Patent Office 3,767,676
Patented Oct. 23, 1973

3,767,676
BENZAZEPINES
Lucien Nedelec, Le Raincy, Jacques Guillaume, Aulnay-sous-Bois, and André Allais, Les Lilas, France, assignors to Roussel-UCLAF, Paris, France
No Drawing. Filed Feb. 28, 1972, Ser. No. 230,123
Claims priority, application France, Mar. 1, 1971, 7106916
Int. Cl. A61k 27/00; C07d 63/18
U.S. Cl. 260—332.3 P          9 Claims

ABSTRACT OF THE DISCLOSURE

Novel 9,10-dihydro-[4H]-thieno-[3,2-b] [f]-benzazepines of the formula

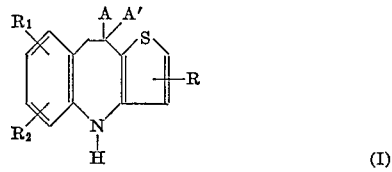

wherein A and A' are individually selected from the group consisting of lower alkoxy and lower alkylthio and taken together are selected from the group consisting of lower alkylenedioxy, lower alkylenedithio and thiolower-alkyleneoxy, R is selected from the group consisting of hydrogen and lower alkyl and $R_1$ and $R_2$ are individually selected from the group consisting of hydrogen, halogen, —$CF_3$, optionally substituted lower alkoxy, lower alkyl-thio, optionally substituted sulfonamido, diloweralkyl-amino and acylamino where the acyl is derived from an organic carboxylic acid of 1 to 18 carbon atoms which are intermediates for 4-(alkylaminoalkyl)-[4H]-thieno-[3,2-b] [f]-benzazepines having antidepressant activity and the process for their preparation and novel intermediates.

OBJECTS OF THE INVENTION

It is an object of the invention to provide the novel benzazepines of Formula I.

It is a further object of the invention to provide a novel process for the preparation of the benzazepines of Formula I.

It is another object of the invention to provide novel intermediates for the benzazepines of Formula I.

These and other objects and advantages of the invention will become obvious from the following detailed description.

THE INVENTION

The novel 9,10-dihydro-[4H]-thieno-[3,2-b] [f]-benzazepines of the invention have the formula

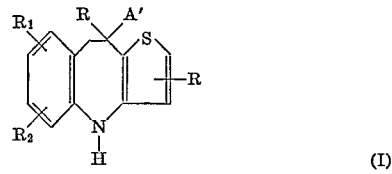

wherein A and A' are individually selected from the group consisting of lower alkoxy and lower alkylthio and taken together are selected from the group consisting of lower alkylenedioxy, lower alkylenedithio and thiolower-alkyleneoxy, R is selected from the group consisting of hydrogen and lower alkyl and $R_1$ and $R_2$ are individually selected from the group consisting of hydrogen, halogen, —$CF_3$, optionally substituted lower alkoxy, lower alkyl-thio, optionally substituted sulfonamido, diloweralkyl-amino and acylamino where the acyl is derived from an organic carboxylic acid of 1 to 18 carbon atoms. Lower is intended to mean 1 to 7 carbon atoms.

Examples of preferred substituents are those where R is hydrogen, ethyl or methyl. Preferred substituents for $R_1$ and $R_2$ are halogens such as chlorine, bromine and fluorine; lower alkoxy such as methoxy, ethoxy, isopropoxy, butoxy, optionally substituted by diloweralkyl-amino, lower alkoxy such as diethylaminoethoxy and β-ethoxyethoxy; lower alkylthio such as methylthio, butyl-thio and pentylthio; sulfonamidos such as sulfonamide, N-methylsulfonamido and N,N-diethylsulfonamido, diloweralkylamino such as dimethylamino, diethylamino, dipropylamino and N-ethyl-N-isopropylamino, dibutyl-amino; and acylamino of an organic carboxylic acid of 1 to 18 carbon atoms such as acetylamino.

Examples of preferred substituents for A and A' when taken individually are lower alkoxy such as methoxy, ethoxy and butoxy and lower alkylthio such as methyl-thio and ethylthio and when taken together are lower alkylenedioxy of 2 to 4 alkylene carbon atoms and lower alkylenedithio of 2 to 4 alkylene carbon atoms optionally substituted with lower alkyl and thioloweralkyleneoxy of 2 to 4 alkylene carbon atoms.

Examples of suitable organic acids of 1 to 18 carbon atoms may be derived from an aliphatic, aromatic, cycloaliphatic or heterocyclic carboxylic acid.

Among the most preferred compounds are those where A and A' are alkylenedioxy such as 10,10-ethylenedioxy-9,10-dihydro-[4H]-thieno-[3,2-b] [f]-benzazepines and where A and A' are methoxy or ethoxy such as 10,10-dimethoxy-9,10-dihydro-[4H]-thieno-[3,2-b] [f]-benzazepines.

The novel process of the invention for the preparation of the benzazepines of Formula I comprises reacting in the presence of a Lewis acid an o-nitrophenylacetic acid of the formula

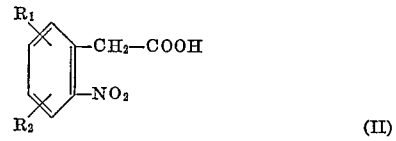

or a functional derivative thereof wherein $R_1$ and $R_2$ have the above definitions with a 3-bromothiophene of the formula

wherein R is in the 4 or 5 position and has the above definition to form a 3-bromo-2-(o-nitrophenylacetyl)-thiophene of the formula

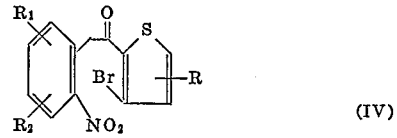

reacting the latter with a carbonyl blocking agent to form the corresponding thiophene of the formula

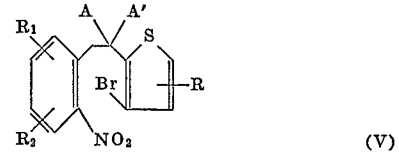

wherein A and A' have the above definition, reacting the latter with a reducing agent to form the corresponding thiophene of the formula

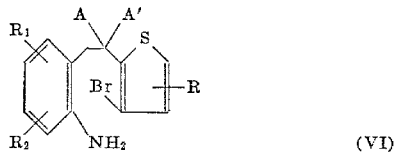

(VI)

and cyclizing the latter by heating in the presence of a cuprous salt to form the corresponding benzazepine of Formula I.

In a preferred mode of the process of the invention, the functional derivative of the o-nitrophenylacetic acid of Formula II is the acid halide prepared by reaction of acid with a halogenating agent such as thionyl chloride, phosphorus pentachloride, phosphorus tribromide or oxalyl chloride. The Lewis acid may be a metal halide such as aluminum chloride, stannic chloride, titanium chloride or vanadium chloride or a mineral acid such an sulfuric acid, phosphoric acid, hydrofluoric acid or polyphosphoric acid. The said condensation is effected in a solvent such as an aromatic hydrocarbon, haloalkane, carbon disulfide or an aromatic nitro derivative.

The carbonyl blocking reagent may be a lower alkanol, lower alkanethiol, lower alkanediol, lower alkanedithiol, or a mercapto lower alkanol wherein the term lower means 1 to 4 carbon atoms in an acid media or a thioxolane or dialkyldioxolane. The reducing agent may be zinc and acetic acid or hydrogenation in the presence of a palladium or platinum catalyst.

The cyclization to form the benzazepine of Formula I is effected by heating at 140–200° C. in the presence of a cuprous halide such as the iodide in the presence of an acid acceptor and in a high boiling solvent such as dimethylformamide, dimethylsulfoxide, isoamyl alcohol and hexamethylphosphorotriamide.

The most preferred embodiment of the process comprises reacting the desired o-nitrophenylacetyl chloride with the desired 3-bromo-thiophene in the presence of stannic chloride in benzene, reacting the resulting product with ethylene glycol in the presence of an alkylsulfonic acid such as methanesulfonic acid or ethanesulfonic acid or an aryl-sulfonic acid such as benezne sulfonic acid, p-toluenesulfonic acid or naphthalenesulfonic acid, reducing the nitro group of the resulting product with zinc in the presence of acetic acid at room temperature and cyclizing the product in refluxing dimethylformamide in the presence of cuprous iodide or an iodine-copper mixture in the presence of alkali metal or alkaline earth metal carbonate such as sodium carbonate.

The thiophene intermediates of Formulae IV, V and VI are novel products and form a portion of the invention The benzazepines of Formula I are useful intermediates for the preparation of the corresponding [4H]-thieno-[3,2-b] [f]-benzazepines with a 4-(alkylaminoalkyl) group which have excellent antidepressant properties with low toxicity as described in copending, commonly assigned U.S. patent application Ser. No. 230,124 filed on even date herewith. This process comprises reacting a benzazepine of Formula I with a dilower-alkyl-aminoalkyl halide in the presence of a metallation agent to obtain the corresponding ketal or thioketal of 4-(dialkylaminoalkyl) - 9,10 - dihydro - 10 - oxo - [4H] - thieno-[3,2-b] [f]-benzazepine, hydrolyzing the latter in an acid media to form 4-(dialkylaminoalkyl)-9,10-dihydro-10-oxo-[4H]-thieno-[3,2-b] [f]-benzazepine, reducing the latter with a mixed alkali metal hydride to form the corresponding 10-hydroxycompound and dehydrating the latter in an acid media to form the corresponding 4-(dialkylaminoalkyl)-[4H]-thieno-[3,2-b] [f]-benzazepine.

In a variation of the process, the 4-(dialkylaminoalkyl)-9,10-dihydro-10-oxo-[4H]-thieno-[3,2-b] [f]-benzazepines are reduced with a mixed alkali metal hydride in the presence of an aluminum halide to form the corresponding 4-(dialkylaminoalkyl)-9,10-dihydro-[4H]-thieno-[3,2-b] [f]-benzazepine.

Both of the said final products may be dealkylated by reaction with an alkyl haloformate and then subjection to alkaline hydrolysis to form the corresponding 4-(alkylaminoalkyl)-benzazepines.

Most o-nitrophenylacetic acids of Formula II used as the starting material are described in the literature such as Gulland [J.C.S., 1931, p. 2872], Schlittler [Helv. Chim. Acta., vol. 15 (1932), p. 394], Ber., vol. 66B (1933), p. 450, Wahl [Bull. Soc. Chim., vol. 5 (1938), p. 653], Parkes [J. Chem. Soc. (1938), p. 1841], Govindachari [Current Sci., vol. 10 (1941), p. 76], Chem. Ab., vol. 35 (1941), p. 3963, Marion [J.A.C.S., vol. 66 (1944), p. 1125] and Dombrowski [Thur. Obsch. Khim., vol. 27 (1957), p. 2000]. Other substituents such as alkylthio, —$CF_3$, sulfonamido, dialkylamino and acylamino may be added by known processes.

In the following examples there are described several preferred embodiments to illustrate the invention. However, it should be understood that the invention is not intended to be limited to the specific embodiments.

EXAMPLE I 10,10-ethylenedioxy-9,10-dihydro-[4H]-thieno-[3,2-b] [f]benzazepine Step A.—3 - bromo - 2 - (2' - nitrophenylacetyl) - thiophene.—100 gm. of o-nitrophenylacetic acid were heated at 45° C. for 1½ hours with 500 ml. of thionyl chloride and the mixture was then distilled to dryness under a vacuum of 0.2 mm. Hg at 20–25° C. to obtain the o-nitrophenylacetic acid chloride (found: Cl, 17.6%; theory, 17.76%). 64 ml. of stannic chloride were mixed with stirring with 200 ml. of benzene and then a solution of the above crude acid chloride and of 90 g. of 3-bromothiophene in 300 ml. of benzene was added over 30 minutes thereto. The mixture was agitated for 16 hours at room temperature and then was poured into a water-ice mixture. The mixture was extracted with ethyl acetate, and the organic phase was washed with a saturated aqueous solution of sodium bicarbonate, then with water until the wash-water was neutral, dried over magnesium sulfate, and concentrated in vacuo to 200 ml. The mixture was ice-cooled overnight and was vacuum filtered. The precipitate was washed with ethyl acetate, then with ether and dried in vacuo to obtain 109 gm. of 3-bromo-2-(2'-nitrophenylacetyl)-thiophene melting at 130° C. The product was purified by chromatography, 19 gm. of the raw product were fixed on silica gel and eluted with a benzene-ethyl acetate mixture (9:1). The first fraction was crystallized from ethyl acetate to obtain 3.69 gm. of product melting at 133° C. A second crystallization of 550 mg. of the product gave 400 mg. of pure 3-bromo-2-(2'-nitrophenylacetyl)-thiophene melting at 138° C. and in the form of colorless crystals soluble in chlorinated solvents, alcohols and benzene, slightly soluble in ethyl acetate and insoluble in water.

Analysis.—Calculated for $C_{12}H_8O_3NBrS$ (molecular weight=326.12) (percent): C, 44.18; H, 2.47; N, 4.29; Br, 24.50; S, 9.83. Found (percent): C, 43.9; H, 2.5; N, 4.3; Br, 24.2; S, 9.5.

IR spectrum (chloroform): Presence of carbonyl at 1662 and 1672 cm.$^{-1}$, of $NO_2$ at 1347 and 1525 cm.$^{-1}$ and of aromatic.

U.V. spectrum (ethanol): Max. at 275 nm., $\epsilon$=17,650.

RMN spectrum: Absorption at 443; 444.5; 448; 454.5; 486; 488.5; 495 Hz.; (aromatic protons) methylene at 288 Hz.; ethylenic protons of thiophene 453; 458; 427; 432 Hz.

Step. B.—ethylene ketal of 3 - bromo - 2(2' - nitrophenylacetyl)-thiophene: A mixture of 32 gm. of 3-bromo-2-(2'-nitrophenylacetyl)-thiophene, 600 ml. of ethylene glycol and 1.7 g. of p-toluene-sulfonic acid was heated for 16 hours at a vacuum of 34 mm. Hg at 125–130° C. (bath temperature) while distilling off the formed water. Then, the temperature was raised to 150° C. for 1 hour at 34 mm. Hg. Then, the reaction mixture was concentrated in one hour to a volume of 150 ml. while maintaining it at 150° C. under 25–30 mm. Hg and after the mixture was cooled, it was made alkaline by addition of 5 ml. of triethylamine. 600 ml. of ice water were added, and the mixture was extracted with ethyl acetate. The organic phases were washed with water, dried over magnesium sulfate and distilled to dryness in vacuo. The residue was dissolved in 20 ml. of methanol and after 20 ml. of ether were added, the crystallization was started. After ice-cooling for 30 minutes, the mixture was vacuum filtered and the precipitate was washed with a methanol-ether mixture (50:50) and dried in vacuo to obtain 23.85 g. of the ethylene ketal of 3-bromo-2-(2'-nitrophenylacetyl)-thiophene melting at 112° C. The product occurred in the form of pale yellow crystals soluble in chlorinated organic solvents and alcohols, slightly soluble in ether and insoluble in water. For analysis, the product was purified by dissolution in methylene chloride and crystallization from isopropyl ether and the melting point remained unchanged.

Analysis.—Calculated for $C_{14}H_{12}O_4NBrS$ (molecular weight=370.23) (percent): C, 45.41; H, 3.27; N, 3.78; Br, 21.59; S, 8.66. Found (percent): C, 45.4; H, 3.2; N, 4.1; Br, 21.8; S, 8.7.

IR spectrum chloroform): Presence of C=C+aromatic at 1622 and 1578 cm.$^{-1}$, of $NO_2$ at 1527 and 1356 cm.$^{-1}$ and of ketal.

U.V. spectrum (ethanol):

Max. at 229–230 nm., $E^{1\%}_{1cm.}$=328, $\epsilon$=12,150

Infl. towards 248 nm., $E^{1\%}_{1cm.}$=276

Infl. towards 295 nm., $E^{1\%}_{1cm.}$=44

Step C.—Ethylene ketal of 3-bromo-2-(2'-aminophenyl acetylthiophene: 69 gm. of the ethylene ketal of 3-bromo-2-(2'-nitrophenylacetyl)-thiophene were mixed with 1400 ml. of acetic acid and after 140 gm. of powdered zinc were added thereto while maintaining the temperature at 20–25° C., the mixture was stirred for 15 minutes at room temperature and then filtered. The filtrate was poured into a 20% aqueous solution of sodium carbonate, and the mixture was extracted with methylene chloride. The organic phases were washed with water until the wash water was neutral, dried over magnesium sulfate and distilled to dryness in vacuo to obtain 62.2 gm. (98% yield) of raw product. For analysis, 1 gm. of product was dissolved in 5 ml. of isopropyl ether at reflux, then filtered, iced for 1 hour and vacuum filtered. The precipitate was washed with isopropyl ether and dried in vacuo to obtain 0.685 gm. of the ethylene ketal of 3-bromo-2-(2'-aminophenylacetyl)-thiophene melting at 71° C. The product occurred in the form of colorless crystals soluble in chlorinated organic solvents, alcohols and ether, slightly soluble in isopropyl ether and insoluble in water.

Analysis.—Calculated for $C_{14}H_{14}O_2NBrS$ (molecular weight=342.25) (percent): C, 49.42; H, 4.15; N, 4.12; Br, 23.49; S, 9.42. Found (percent): C, 49.3; H, 4.1; N, 4.2; Br, 23.2; S, 9.1.

IR spectrum (chloroform): Presence of aromatic substituted by heteroatom at 1588 and 1492 cm.$^{-1}$, of $C_6H_5NH_2$ at 3428 and 3344 cm.$^{-1}$, of NH at 1626 cm.$^{-1}$ and of ketal.

U.V. spectrum (ethanol):

Max. at 232 nm., $E^{1\%}_{1cm.}$=424, $\epsilon$=14,500

Max. at 286 nm., $E^{1\%}_{1cm.}$=71

Step D.—10,10 - ethylenedioxy - 9,10-dihydro-[4H]-thieno-[3,2-b] [f]-benzazepine: A mixture of 17 gm. of the ethylene ketal of 3-bromo-2-(2'-aminophenylacetyl)-thiophene, 8.2 gm. of potassium carbonate, 1.6 gm. of powdered copper, 1.14 gm. of iodine and 115 ml. of dimethylformamide was refluxed for 140 hours and the mixture was then cooled and filtered. The insolubles were washed with chloroform and the filtrate was distilled to dryness. The residue was dissolved in 30 ml. of ethanol at reflux and then filtered and iced for 1 hour. The mixture was vacuum filtered and the precipitate was washed with ethanol and dried in vacuo at 60° C. to obtain 9.06 gm. of 10,10-ethylenedioxy - 9,10 - dihydro - [4H]-thieno [3,2-b] [f]-benzazepine melting at 165° C. The product occurred in the form of yellow crystals soluble in chlorinated organic solvents and methanol, slightly soluble in ethanol and ethers and insoluble in water. For analysis, the product was crystallized from ethanol and the melting point remained unchanged.

Analysis.—Calculated for $C_{14}H_{13}O_2NS$ (molecular weight=259.32) (percent): C, 64.84; H, 5.05; N, 5.40; S, 12.36. Found (percent): C, 64.4; H, 5.0; N, 5.5; S, 12.0.

IR spectrum (chloroform): Presence of NH at 3440 cm.$^{-1}$ and of C=C and aromatic at 1609, 1592, 1573 and 1513 cm.$^{-1}$.

U.V. spectrum (ethanol): Max. at 232 nm., $\epsilon$=12,500; max. at 257–258 nm., $\epsilon$=7,400; max. at 301 nm., $\epsilon$=10,000.

EXAMPLE II 10,10-ethylenedioxy-6-chloro-9,10-dihydro-[4H]-thieno-[3,2-b] [f]-benzazepine Using the procedure of Example I, 2-nitro-4-chlorophenyl-acetic acid and thionyl chloride were reacted to obtain the corresponding acid chloride which was reacted with 3 - bromo-thiophene to obtain 3-bromo-2-(2'-nitro-4'-chlorophenylacetyl)-thiophene melting at 146–147° C. The latter was reacted with ethylene glycol in the presence of p-toluene sulfonic acid to obtain the ethylene ketal of 3 - bromo - 2-(2'-nitro-4'-chlorophenylacetyl)-thiophene melting at 79° C. and subjecting the latter to the action of zinc in the presence of acetic acid to obtain the ethylene ketal of 3 - bromo - 2 - (2'-amino-4'-chlorophenylacetyl)-thiophene melting at 79° C. and then cyclizing the latter by heating at reflux in the presence of potassium carbonate, powdered copper, iodine and dimethylformamide to obtain 10,10 - ethylenedioxy - 6 - chloro-9,10-dihydro-[4H]-thieno-[3,2-b] [f]-benzazepine melting at 153° C.

Various modifications of the process and products of the invention may be made without departing from the spirit or scope thereof and it is to be understood that the invention is to be limited only as defined in the appended claims.

We claim:

1. A 9,10 - dihydro - [4H] - thieno - [3,2-b] [f]-benzazepine of the formula

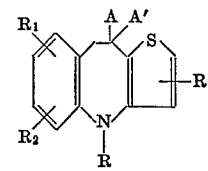

wherein A and A' are individually selected from the group consisting of lower alkoxy and lower alkylthio or taken together are selected from the group consisting of lower alkylenedioxy, lower alkylenedithio and thiolower-alkyleneoxy, R is selected from the group consisting of hydrogen and lower alkyl and $R_1$ and $R_2$ are individually selected from the group consisting of hydrogen, halogen, —$CF_3$, lower alkoxy optionally substituted with lower alkoxy or diloweralkylamino, lower alkylthio, sulfonamido optionally substituted with 1 or 2 lower alkyl, diloweralkylamino and acetamino.

2. A compound of claim 1 wherein A and A' together are ethylenedioxy.

3. A compound of claim 1 which is 10,10-ethylenedioxy - 9,10 - dihydro - [4H] - thieno - [3,2-b] [f]-benzazepine.

4. A compound of claim 1 which is 6-chloro-10,10-ethylenedioxy - 9,10 - dihydro - [4H] - thieno - [3,2-b][f]-benzazepine.

5. A compound of the formula

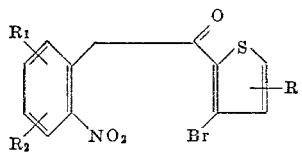

wherein R is selected from the group consisting of hydrogen and lower alkyl of 1 to 7 carbon atoms and $R_1$ and $R_2$ are individually selected from the group consisting of hydrogen, halogen, —$CF_3$, lower alkoxy optionally substituted with lower alkoxy or diloweralkylamino, lower alkylthio, sulfonamido optionally substituted with 1 or 2 lower alkyl, diloweralkylamino and acetamino.

6. A compound of claim 5 which is 3-bromo-2-(o-nitrophenylacetyl)-thiophene.

7. A compound of the formula

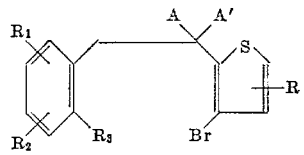

wherein R is selected from the group consisting of hydrogen and lower alkyl of 1 to 7 carbon atoms and $R_1$ and $R_2$ are individually selected from the group consisting of hydrogen, halogen, —$CF_3$, lower alkoxy optionally substituted with lower alkoxy or diloweralkylamino, lower alkylthio, sulfonamido optionally substituted with 1 or 2 lower alkyl, diloweralkylamino and acetamino, $R_3$ is selected from the group consisting of —$NO_2$ and —$NH_2$ and A and A' are individually selected from the group consisting of lower alkoxy and lower alkylthio or taken together are selected from the group consisting of lower alkylenedioxy, lower alkylenedithio and thio lower alkyleneoxy.

8. A compound of claim 7 which is the ethylene ketal of 3-bromo-2-(o-nitrophenylacetyl)-thiophene.

9. A compound of claim 7 which is the ethylene ketal of 3-bromo-2-(o-aminophenylacetyl)-thiophene.

References Cited

Morrison: Organic Chemistry (Allyn and Bacon, Boston, 1959), pp. 525, 526, 634–636 and 840–842.

HENRY R. JILES, Primary Examiner

C. M. S. JAISLE, Assistant Examiner

U.S. Cl. X.R.

260—329 HS, 329 S, 332.2 R, 332.3 C, 332.3 H, 332.3 R, 332.5; 424—275, 276, 277